A. ROSCETTA.
CHAIN, BELT, AND THE LIKE.
APPLICATION FILED AUG. 7, 1917.
1,260,714.
Patented Mar. 26, 1918.
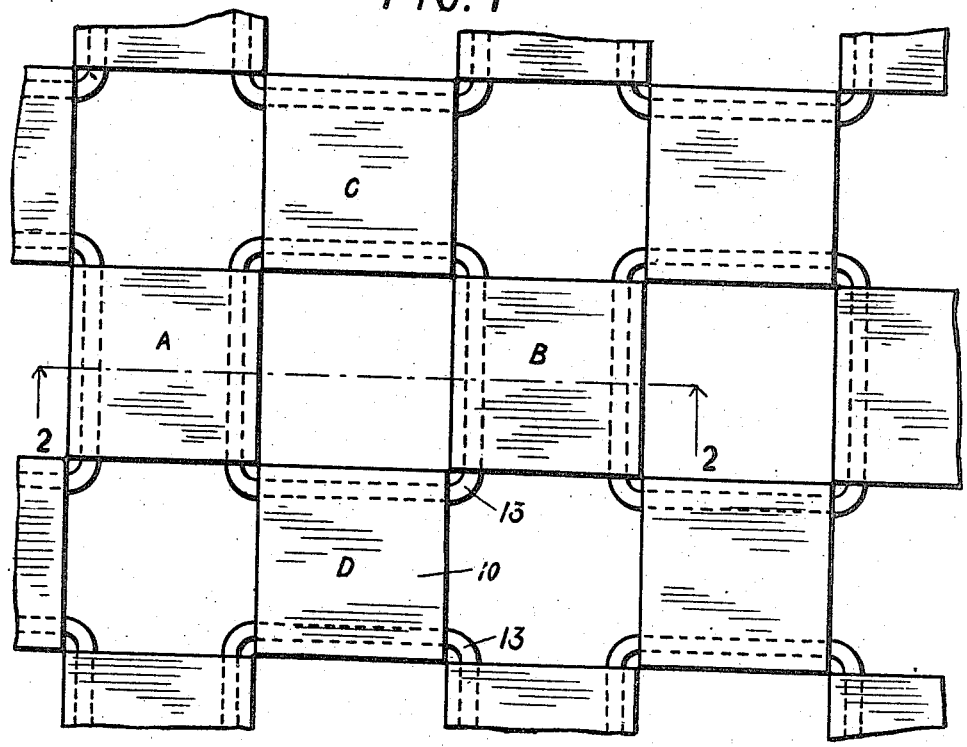
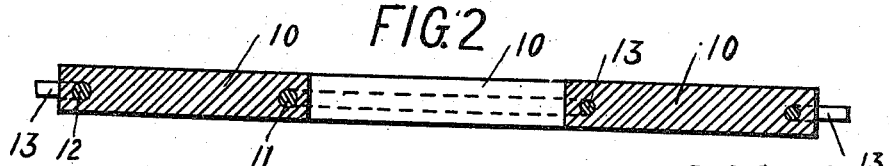
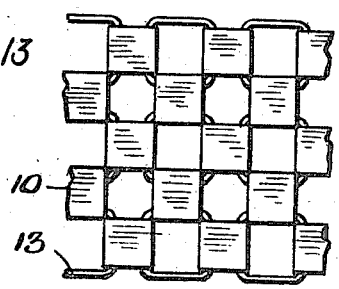
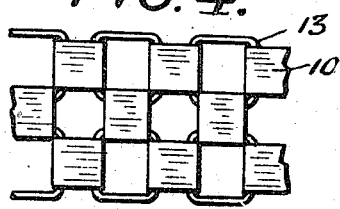
Inventor
Antonio Roscetta
by Hazard & Miller
Attys.

UNITED STATES PATENT OFFICE.

ANTONIO ROSCETTA, OF JEROME, ARIZONA.

CHAIN, BELT, AND THE LIKE.

1,260,714.      Specification of Letters Patent.      Patented Mar. 26, 1918.

Application filed August 7, 1917. Serial No. 184,969.

*To all whom it may concern:*

Be it known that I, ANTONIO ROSCETTA, a citizen of the United States, residing at Jerome, in the county of Yavapai and State of Arizona, have invented new and useful Improvements in Chains, Belts, and the like, of which the following is a specification.

This invention relates to a chain.

It is the principal object of this invention to provide a chain, belt or the like which is formed with alternately closed and open links so connected in relation to each other as to be universally flexible and designed to provide openings through the chain of uniform size.

Other objects will appear hereinafter.

The invention is illustrated, by way of example, in the accompanying drawings in which:

Figure 1 is a fragmentary view in plan illustrating a portion of the chain and particularly disclosing the relation of the links to each other.

Fig. 2 is a view in section and elevation, as seen on the line 2—2 of Fig. 1, and illustrates the disposition of the solid and open links in relation to each other.

Fig. 3 is a view in perspective illustrating one of the solid links and fragmentary portions of the open connecting links.

Fig. 4 is a plan view of a fragment of a chain, belt or the like embodying the principles of my invention, the view being drawn to show the finished edges, and the chain being three blocks wide.

Fig. 5 is a view analogous to Fig. 4 and showing a chain five blocks wide.

Referring more particularly to the drawings, 10 indicates a square solid chain link which is preferably formed of a metal and is rectangular in cross section. This link is formed with a pair of parallel openings 11 and 12 which are disposed at its opposite ends and are adapted to receive a rectangular connecting link 13. It will be understood that a plurality of square links 10 are used in making the chain, as well as a plurality of open links 13. As particularly disclosed in Fig. 1, four of the solid links are arranged at right angles to each other with their link openings disposed in similar relation to each other and adjacent the space formed by the links, after which one of the open links 13 is positioned through the adjacent link openings. This connection allows solid links A and B to be hinged at opposite sides of the open link and free to swing throughout the same plane, while solid links C and D are disposed along the other sides of the link 13 and adapted to swing throughout a plane at right-angles to the plane of movement of the links A and B. By assembling a plurality of solid and open links, as described, a chain fabric will be constructed which will have flexibility, both longitudinally and transversely, thus providing a chain, belt or the like, adapted for use in various arts.

The principles of my invention may be applied to transmission belts, wearing apparel belts, skid chains, watch chains, and the like, and to many of the various uses where a universally flexible inelastic metallic fabric is desired.

It will thus be seen that the chain here provided is formed of simple elements which may be readily assembled and replaced and are capable of moving universally in relation to each other while providing a surface having uniform solid and open spaces.

While I have shown the preferred form of my chain as now known to me, it is evident that various changes in the combination, construction and arrangement of parts may be made by those skilled in the art without departing from the spirit of my invention.

I claim:

1. A chain, comprising a plurality of flat square links formed of a solid plate of metal and having parallel passage-ways extending transversely of their opposite ends, said link plates being disposed with their corners adjacent each other to form rectangular openings substantially the same area as one of the links, and wire connecting links adapted to extend through the adjacent openings in the link plates and hold the links in hinged relation to each other.

2. A plurality of flat rectangular-plate links fitting together corner to corner like the figures on a checkerboard, and wire links passing through the plate links around the open square between the links.

In testimony whereof I have signed my name to this specification.

ANTONIO ROSCETTA.